United States Patent [19]
Jones

[11] Patent Number: 5,774,618
[45] Date of Patent: Jun. 30, 1998

[54] COMPACT CLOSURE FOR OPTICAL FIBER CABLE

[75] Inventor: Wesley Willing Jones, Lawrenceville, Ga.

[73] Assignee: Lucent Technologies Inc., Murray Hill, N.J.

[21] Appl. No.: 773,811

[22] Filed: Dec. 19, 1996

[51] Int. Cl.⁶ .................................................. G02B 6/36
[52] U.S. Cl. .......................................... 385/135; 385/134
[58] Field of Search ................................... 385/134–136, 385/100, 147

[56] References Cited

U.S. PATENT DOCUMENTS

| | | | |
|---|---|---|---|
| 4,679,896 | 7/1987 | Krafcik et al. | 350/96.2 |
| 4,913,522 | 4/1990 | Nolf et al. | 350/96.2 |
| 5,097,529 | 3/1992 | Cobb et al. | 385/135 |
| 5,185,845 | 2/1993 | Jones | 385/135 |
| 5,255,337 | 10/1993 | Theys et al. | 385/135 |
| 5,280,556 | 1/1994 | Jones | 385/139 |
| 5,481,639 | 1/1996 | Cobb et al. | 385/135 |
| 5,568,584 | 10/1996 | Smith | 385/135 |
| 5,596,670 | 1/1997 | Debortoli et al. | 385/135 |
| 5,617,501 | 4/1997 | Miller et al. | 385/134 |

*Primary Examiner*—John D. Lee

[57] ABSTRACT

A closure for optical fiber cables has a cover member and an end plate having an O-ring seal for sealing the end plate to the cover member by means of over-center latches. The inner surface of the end plate has a backbone member to which are mounted a fiber organizer and splice tray, a cable sheath grip, and a central strength member anchor for use with cables having central strength members. The end plate has openings for grommets through which cables pass into the interior of the closure, and a grommet and port plug retaining member fits over the outer ends of the grommet or grommets or grommet and port plug. The backbone member, which may be integral with the end plate, has a wall and flange portion that bears against the inner end of the grommet or grommets toward the closure interior. A threaded stud is connected to the backbone member and passes through the end plate and the retainer member, and a clamping knob threaded onto the stud enables tightening of the retainer and backbone against the ends of the grommet or grommets to insure a high degree of sealing of the interior of the closure from the exterior ambient atmosphere and water, and also from the effects of interior air pressure.

20 Claims, 7 Drawing Sheets

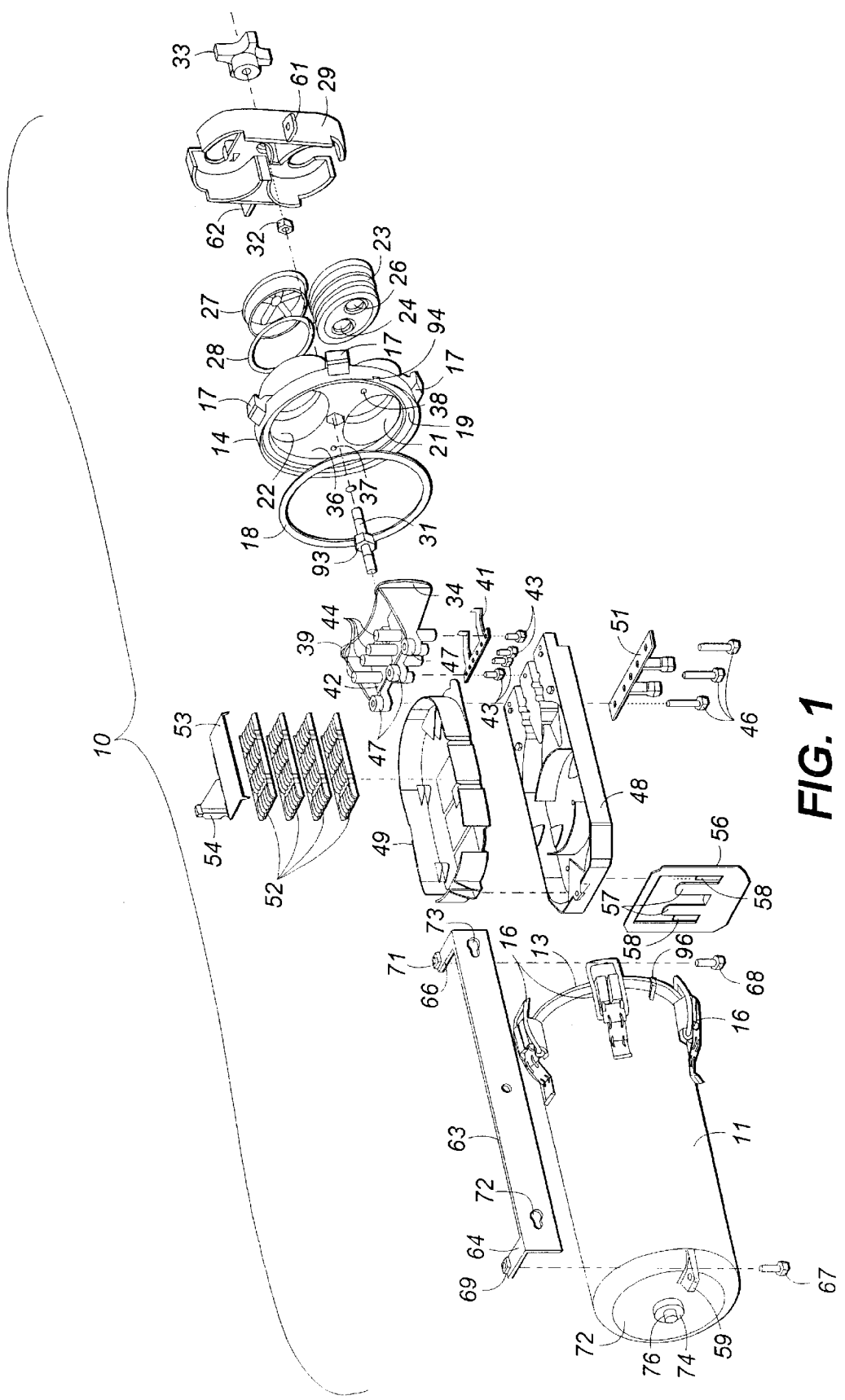

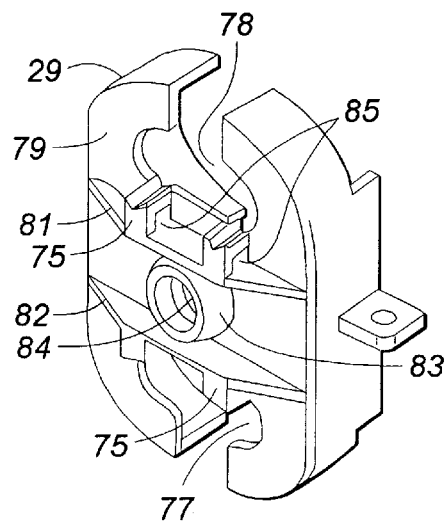 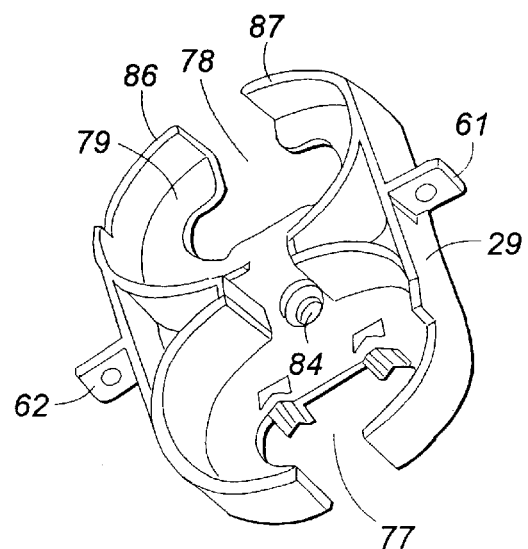
FIG. 4A          FIG. 4B
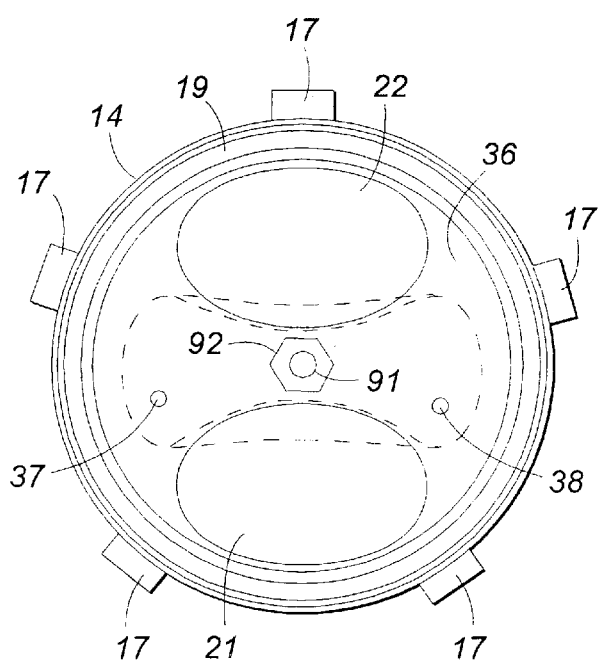 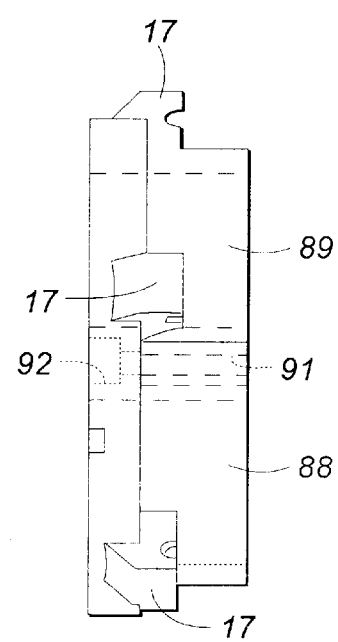
FIG. 5A          FIG. 5B

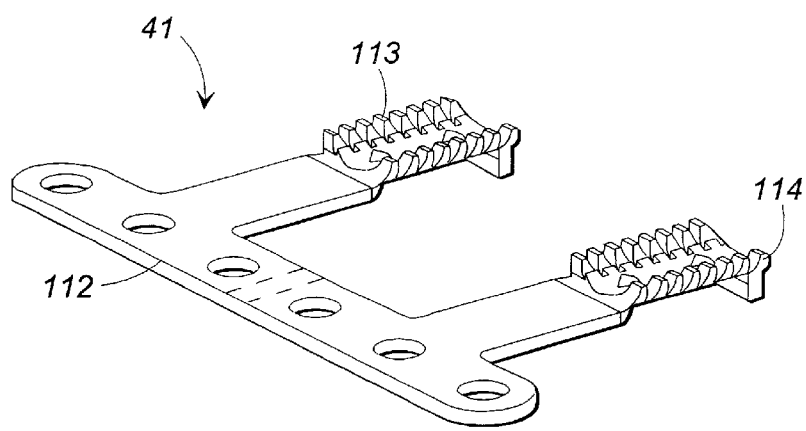
FIG. 7A
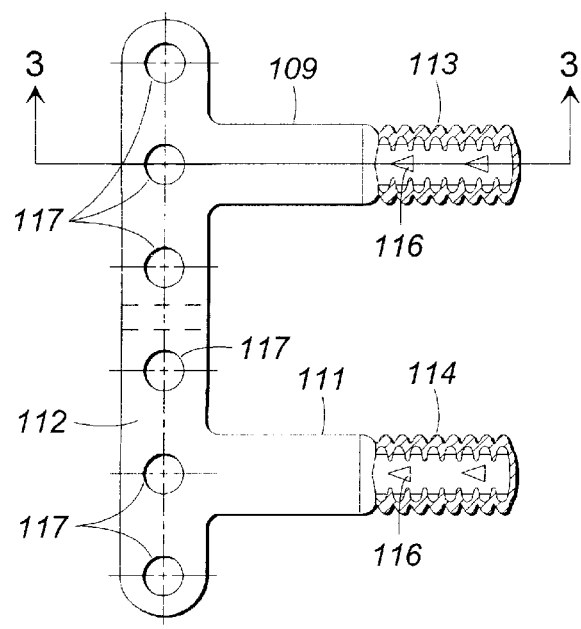 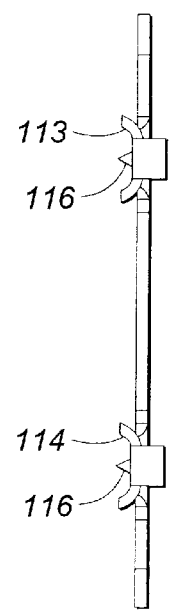
FIG. 7B     FIG. 7C
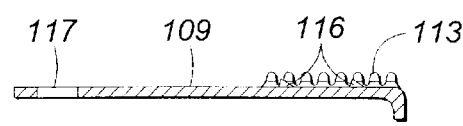
FIG. 7D

COMPACT CLOSURE FOR OPTICAL FIBER CABLE

FIELD OF INVENTION

This invention relates to a space saving optical fiber closure, and more particularly, to a closure for optical fiber cables which has increased storage capacity, a high level of environmental protection and of water-tight integrity, and which has improved convenience in installation and use and low cost.

BACKGROUND OF THE INVENTION

The use of communication cables which include a plurality of optical fibers is increasing rapidly. An optical fiber cable may comprise a plurality of glass fibers, each of which is protected by at least one layer of coating material. The fibers may be assembled into units in which they are held together by binder ribbons or within tubes to provide a core. Another optical fiber cable core includes a ribbon type fiber arrangement in which a plurality, such as, for example, twelve fibers, are arranged side-by-side in a ribbon configuration. A plurality of such ribbons may be stacked to obtain a high fiber count cable. The core is generally enclosed by a plastic tube and a plastic jacket. Ribbon type cable which contains a relatively large number of optical fibers is well suited for fiber-to-the-customer or fiber-in-the loop use.

Whatever the structure of the cable, there necessarily must be provisions for splicing the fibers at one end of a given length of cable to corresponding fibers at an adjacent end of another length of cable. When metallic conductors are also present, it is common practice to use a splice closure within which strength members of the cable ends are anchored and all the metallic conductors are spliced, wrapped, and stored. In the splicing of metallic conductors, it is quite common, and often necessary, to bend the conductors sharply to provide access to other connections, and to fit the splices within the available space. However, such bends are, in general, intolerable for optical fibers.

The physical nature of optical fibers, including their small size, inherent brittleness, and relative fragility forecloses the use of splicing techniques common for metallic conductors, including the orientation of the fibers within the available splice closure space, where too sharp bends, for example, are anathema. Transmission capabilities can be impaired by bending an optical fiber beyond an allowable bending radius, the point at which light is no longer completely contained within the fiber. In addition, the expected life of the fibers is reduced if they are bent more sharply than allowed by the minimum bending radius. Generally, the radius to which an optical fiber can be bent without affecting orderly transmission is substantially greater than the radius at which the optical fiber will break. Whereas glass and silica, the materials used to make optical fiber are, in some respects, stronger than steel, optical fibers normally do not possess this potential strength because of microscopic surface fractures, most often incurred in manipulation of the fiber, which are vulnerable to stress and spread, causing the fiber to break easily.

Thus, it is clear that an optical fiber cable does not lend itself to the splicing techniques of metallic conductors. The individual glass fibers cannot be twisted, tied, wrapped, and jammed into a splice closure in anything like the manner of wire-like or metallic conductors. These small diameter glass fibers cannot be crimped or sharply bent, and, inasmuch as glass fibers have memory, their tendency to return to straight line orientation makes placement within a splice closure somewhat difficult. Moreover, the interconnection of optical fibers is a precision operation which is difficult to perform in the field, such as in a manhole or at pole-suspension elevation. These problems are particularly acute in multifiber cables where individual optical fibers must be spliced in a manner which allows ready access for future repairs and maintenance. In addition, fiber slack normally must be provided adjacent to the splices. The need to store the slack further complicates the problem of providing a suitable optical fiber closure.

When splicing optical fibers, it is generally necessary to provide enough slack fiber so that the fiber can be pulled out of the closure for joining the ends together. This usually requires at least one-half of a meter (0.5 m) of fiber from each cable to be stored in the splice closure when the closure is sealed after completion of the splices. For a multifiber cable there must be an arrangement for storing this slack while protecting the splices and while keeping the fibers together in an orderly manner. The splices should be easily accessible for rearrangement or maintenance, which places added demands on the structure of the splice closure.

Also, there is a need for a closure which is particularly suited to the fiber-in-the-loop market where relatively small count optical fiber cables are used. Thus, desirably, the closure should fulfill all of the aforementioned desiderata while at the same time being of relatively small size and relatively inexpensive.

It is especially important that the cables extending into or out of the closure be held tightly to prevent any undesired movement of portions of the cable within the closure. Such movement will also cause movement of the fibers which, in turn, can adversely effect the transmission characteristics of the fibers and place mechanical stresses thereon. In addition, the cables entering the closure pass through flexible grommets which serve to provide, among other things, sealing of the interior of the closure from the ambient environment. If movement, usually longitudinal, of the cables occurs, the seal between the grommet and the cable can be broken. In the prior art, a metal member extending from an inner plate of the closure to an outer end plate and annular worm gear clamps about the cable and the metal member have been used to secure the cable to the metal member. This arrangement prevents the cable from being pulled out, but it does not prevent the grommets from being displaced. Displacement of the grommets can be caused by air pressure within the closure which is used to check the integrity of the seals, or by external forces such as water pressure or ice formation tending to push the grommets inwardly.

Each closure should be capable of being used with a range of cable sizes. In the past, metal cable gripping hardware had to be bent, in the field, to accommodate the differing cable sizes. Further, it is desirable that the cable sheaths, which can be and often are metallic, be electrically connected together to provide grounding for the sheaths.

In general, closures for containing splices comprise a housing, preferably cylindrical, having a closed end, and an open end onto which an end plate is mounted. The end plate assembly has at least one opening therethrough, a sealing device, i.e., a grommet, disposed in the opening which includes a passageway for a cable to pass therethrough, and a cable sheath gripping assembly disposed within or adjacent to the end plate assembly. An example of such a housing is shown in U.S. Pat. No. 5,097,529 of Cobb et al., and an example of a cable gripping assembly is shown in U.S. Pat. No. 5,280,556 of Jones. The end plate of the Cobb et al. arrangement comprises two parts which exacerbates the problem of the sealing of the interior of the closure from the exterior atmosphere. In the Cobb et al. arrangement, sealing between the two parts is accomplished by a gasket. The cable gripping assembly of Jones insures adequate gripping of any of a number of different sized cables, but it comprises several parts which must be carefully assembled, and hence, although effective, it does not have the degree of simplicity which is desired. In addition, it has also been the practice to fill the closure with an encapsulant to insure protection of the splices. The presence of encapsulant makes disassembly and/or maintenance or resplicing difficult inasmuch as the encapsulant must be removed.

What the prior art appears to lack is an optical fiber cable closure of low cost construction which is compact and yet provides ample space for holding a plurality of splices, which is easily assembled in the field; which has a minimum number of components; yet which provides a high degree of sealing and maintenance of sealing integrity.

SUMMARY OF THE INVENTION

The present invention is an optical fiber splice closure which overcomes many of the problems of the prior art while at the same time being of relatively simple compact construction for easy assembly and use, especially in the field.

The closure of the invention comprises a hollow cylindrical cover member having a closed end and an open end, a single piece end plate for the open end and a support means for supporting a splice tray within the closure. The end plate has first and second bores therein for containing first and second grommets of resilient elastomeric material, and each grommet has first and second openings therein for receiving the end portions of two optical fiber cables. A grommet retainer member is mounted on the external face of the end plate for retaining the grommets in position within their respective bores. The end plate has a circumferential channel therein containing an O-ring sealing member which bears against the periphery of the open end of the cover, and is clamped to the cover by means of over-center clamps of the type shown in the aforementioned Cobb et al. patent. Thus, when the end single plate as opposed to a two part plate is mounted to the cover, an extremely tight seal is produced for maintaining the waterproof integrity of the closure as well as resisting internal air pressure and exterior forces, as also is done by the grommets containing the cables.

In accordance with a feature of the invention, a support or backbone member is located on the interior face of the end plate, either integral therewith or mounted by means of an axially extending double end threaded stud which extends through the end plate and the grommet retaining member to a tightening knob with appropriate sealing means such as an O-ring in the opening in the end plate through which the stud passes. The backbone member comprises a face plate which bears against the inner face of the end plate and which has laterally protruding flanges thereon which bear against the grommets and function as interior stops for them. Thus, when the end plate is mounted to the cover, the flanges and the grommet retaining member, which also bears against the grommets, prevent any movement of the grommets longitudinally which might break the seals such as would normally occur when tension or pulling forces on the cable occurs, or when there is internal air pressure, or when exterior water or ice pressure exteriorly of the closure would normally force the grommets inwardly, thereby breaking their seal. Extending from the rear of the face plate of the backbone member is a platform upon which are arrayed a plurality of tubular members or elongated bosses designed to receive threaded bolts or screws which extend through the platform, and the interior or distal edge of the platform has an array of threaded bosses extending across it. A metallic cantilevered cable sheath grip member having a square U-shape is mounted to the tubular members by means of a plurality of bolts extending through the base of the U-shape. The cantilevered arms of the sheath grip are adapted to grip the cables extending into the closure in conjunction with suitable bonding clamps, and, being cantilevered, they have sufficient flexibility to accommodate cables of various sizes without forcing movement of the cables themselves, which might tend to break the grommet seal. Also, being metallic, the sheath grip insures that both cables sheaths, where metallic, are at the same potential when the sheath grip is clamped to the cables.

Mounted to the rear of the platform of the backbone by means of bolts threaded into the bosses arrayed along the edge thereof is a distribution organizer to which is mounted, in turn, a splice tray. Also mounted to the undersides of the distribution organizer is a central strength member anchor means for use when the cables have central strength members, such as loose tube cables. Anchoring of the central strength members increases the resistance of the assembly to external forces such as tensile forces on the cable. The rear end, i.e., the end remote from the backbone, of the distribution organizer is supported by a support member which snaps onto the end of the distribution organizer and which has a contoured shape for resting against the curved inner wall of the closure.

The backbone member as described functions as a locus for all of the parts of the closure relating to its function,. Thus, it helps maintain the grommets in fixed position, it supports the means for gripping and bonding the cable sheath, it supports the distribution organizer and splice tray, and it provides a support for an anchor for cable central strength members.

The closed end of the closure is provided with a flat projecting mounting lug, and the grommet retainer is likewise provided with a similar lug. When the end plate assembly is to be mounted to the closure, these lugs are aligned by means of a lug on the cover rim and a slot in the end plate, and provide mounting means for support brackets for mounting the closure in fixed position.

BRIEF DESCRIPTION OF THE DRAWINGS

The features and advantages of the present invention will be more readily understood from the following detailed description of a preferred embodiment thereof, when read in conjunction with the accompanying drawings in which:

FIG. 1 is an exploded perspective view of the cable closure of the present invention;

FIGS. 4A and 4B are perspective views of the front and rear, respectively, of the grommet retainer member;

FIG. 5A is an elevation view of the interior side of the end plate of the closure of FIG. 1;

FIG. 5B is a side elevation view of the end plate of FIG. 5A;

FIG. 7A is a perspective view of the sheath grip member of the invention;

FIG. 7B is a plan view of the sheath grip member;

FIG. 7C is an end view of the sheath grip member;

FIG. 7D is a cross-section of the sheath grip member taken along the line III—III of FIG. 7B;

DETAILED DESCRIPTION

Figure 2A:
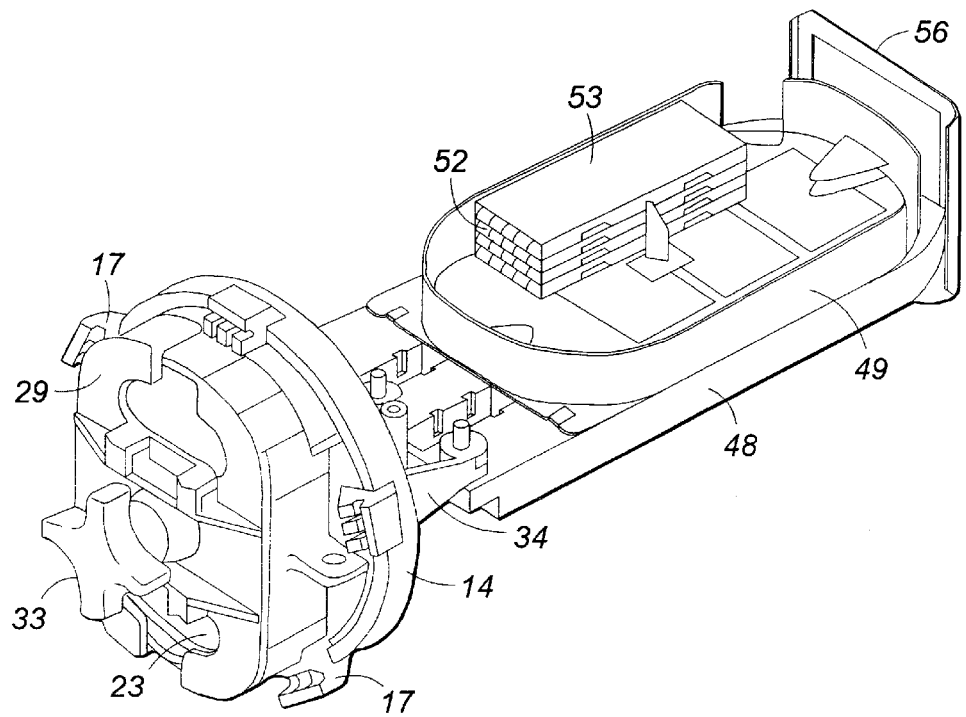
FIGS. 2A and 2B are interior and exterior perspective views, respectively, of the closure of FIG. 1.

In FIG. 1 there is shown a closure 10 which embodies the principles and features of the present invention. The closure 10 comprises a hollow cylindrical cover member 11 of suitable material such as a rigid plastic, and has a closed end 12 and an open end 13. A one piece end plate 14 is adapted to fit over the open end 13 of member 11, and to be clamped thereto by means of over-center clamps 16 which engage lugs 17 on end plate 14. An O-ring 18 of suitable resilient material rides in a channel 19 in the end plate 14 and produces an extremely water tight and air tight seal when plate 14 is clamped to cover 11.

Plate 14 has formed therein first and second elliptically shaped bores 21 and 22 which extend therethrough. Bores 21 and 22 provide ingress and egress of optical fiber cables (not shown) which pass through resilient grommets 23 of suitable elastomeric material, only one of which is shown. The grommets 23 are of a standard design which is widely used in the communications industry, as shown in U.S. Pat. No. 5,481,639 of Cobb et al, 5,185,845 of Jones, and 5,280,556 of Jones. Each grommet 23 has first and second bores 24, 26 therethrough, each of which surrounds and grips a cable so that when a cable containing grommet 23 is inserted in its bore 21, for example, substantially completely water tight and air tight seals between the cable and the grommet 23 and between the grommet 23, which fills the opening or bore 21, and the end plate 14 are produced. As shown in FIG. 1, only bore 21 is being used, hence, bore 22 is plugged and sealed by the combination of a port plug 27 and O-ring 28. A grommet retainer member 29 is mounted to the exterior of the end plate 14 by means of a double threaded end stud 31, nut 32, and clamping knob 33, as will be discussed more fully hereinafter. Bolt 31 also functions to mount a backbone or support member 34 to the inner face 36 of plate 14, that is, the face that faces the interior of the closure 10. As will be discussed more fully hereinafter, backbone member 34 is located and held in proper position relative to bores 21 and 22 by means of locating pins 37 and 38 which fit into corresponding holes, not shown, in the rear wall 39 of backbone member 34. A cantilever cable sheath grip 41 is mounted to the rearwardly extending platform 42 by means of bolts 43 which are received in elongated threaded bosses 44.

Also mounted to platform 42 at the rear thereof by means of bolts 46 threaded into bosses 47 is a distribution organizer member 48 to which is removably mounted a splice tray 49. Bolts 46 also function to secure a central strength member anchor means 51 to the underside of organizer 48. Splice tray 49 is adapted to hold a plurality of stacked splice holders 52 which are held in place by means of a splice holder lid 53 and a latch 54. The organizer 48 which is supported by the backbone member 34 at its proximal end is supported within the cover member 11 by a support member 56 which has fingers 57 and 58 which snap into slots, not shown, in organizer 48. Thus, when the assembly is inserted into cover 11, all of the parts are fully supported.

The closed end 12 of cover 11 has a lug 59 formed thereon and a corresponding lugs 61 and 62 are formed on grommet retainer member 29. When properly assembled, either lug 61 or 62 is aligned with lug 59 so that a mounting bracket 63 having legs 64 and 66 is mounted to the lugs 59 and 61 or 62 by means of bolts 67 and 68 and nuts 69 and 71. Bracket 63 makes possible the mounting of closure 11 to a wall, a pole, an aerial strand or a cabinet, or other location having members, not shown, which fit within holes 72 and 73 on bracket 63. It is to be understood that many different types of brackets can be used, depending upon the application.

It can be seen that the closure assembly 10 of FIG. 1 is both simple and compact, and is relatively easily assembled or dis-assembled. The backbone member 34 firmly supports all of the necessary operative portions of assembly, including the organizer 48, splice tray 49, cable sheath grip 41, the central strength member anchor 51, and, by means of, stud 31 which is anchored thereto by anchor means 45, such as a nut, end plate 14 and grommet retainer 29. In addition, knob 33 affords a measure of adjustment of tightness of the grommet retainer 29 relative to the grommets and of the backbone plate relative to the grommets, and overcenter clamps 16 insure that O-ring 18 forms a water and air tight seal between end plate 14 and the cover 11, thereby obviating the necessity of using an encapsulant. The integrity of the seals of O-ring 19 and grommet 33 can be checked after assembly by the introduction of air under pressure through an air inlet valve, not shown, which can be screwed into a boss 74 after which test the air inlet opening can be sealed by a pipe plug 76. The pressurized air may tend to push the grommet 23 outward, thereby destroying its seal. However, the grommet retainer 29 prevents the grommet 23 from moving in the outward direction. Also, outside forces or pressures such as water or ice pressure may tend to force the grommets inwardly, but the rear wall 39 of the backbone member 34 prevents inward movement of the grommet or grommets. Movement of the cable within the grommet is substantially prevented by means of the cable sheath grip clamped to the cable by suitable clamps, not shown, sufficiently to maintain the integrity of the grommet seal. It can be seen, therefore, that those forces or movements which might destroy the seals are either prevented or resisted so that there is maintained, after assembly, a closure whose water tight and air tight integrity is not compromised.

Figure 2B:
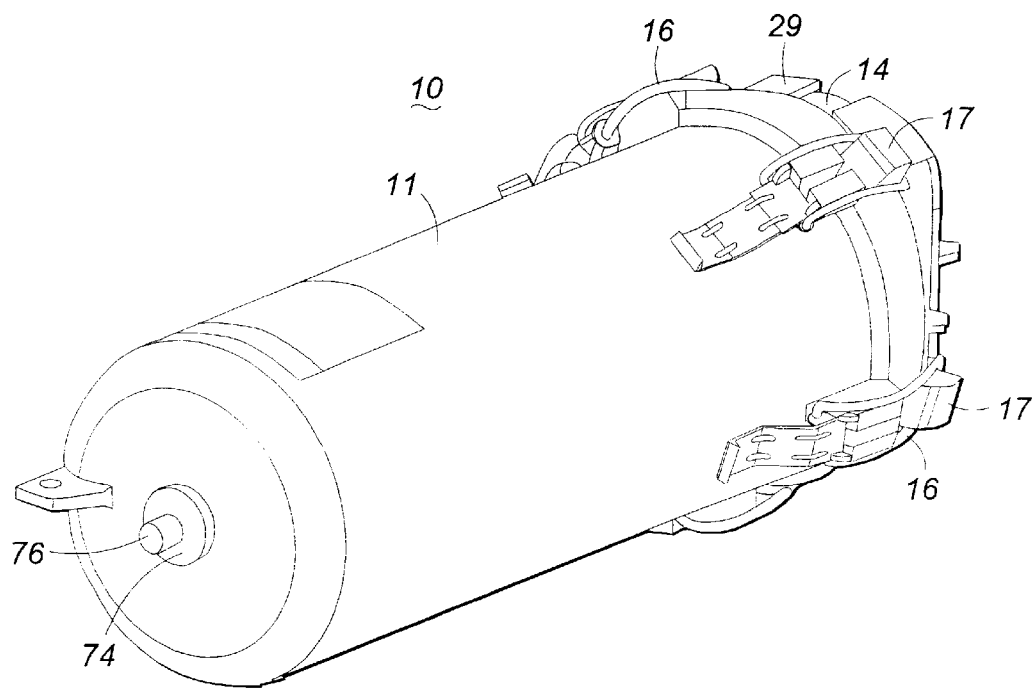

FIG. 2 A is a perspective view of the assembled element of the closure 10, ready for insertion into the cylindrical cover member 11, and FIG. 2B is a perspective view of the assembled closure 10 with the cover member 11 in place. As can be seen in FIG. 2A, all of the operative parts discussed in relation to FIG. 1 form a single unitary assembly by virtue of the backbone member 34 to which they are all, either directly or indirectly, attached, and the end plate 14 of the unitary assembly is firmly held against the cover 11 to insure a water and air tight seal.

Figure 3A:
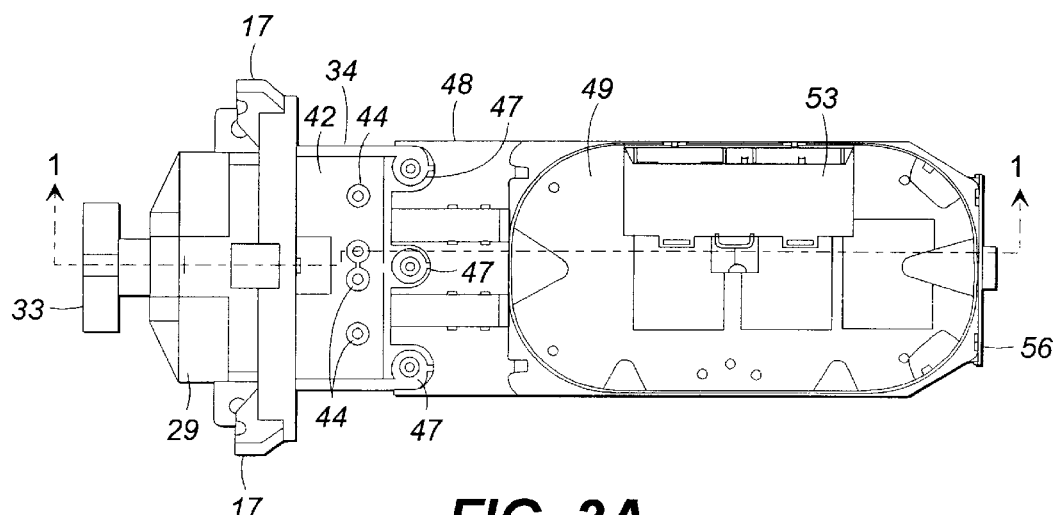
FIG. 3A is a plan view of the interior assembly of the, closure of FIG. 1.
Figure 3B:
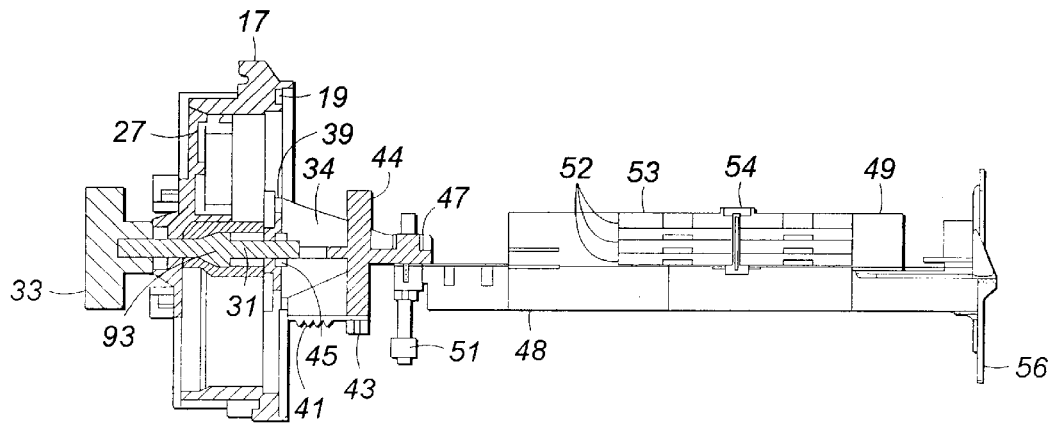
FIG. 3B is an elevation view of the closure end of the closure of FIG. 1.
Figure 3C:
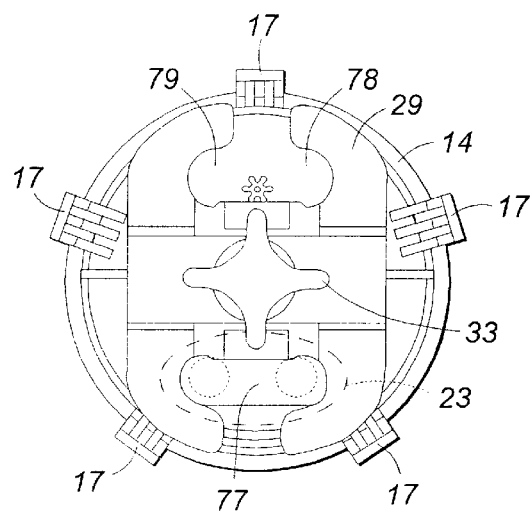
FIG. 3C is a cross-sectional view taken along the line I—I of FIG. 3A.

FIG. 3A is a plan view of the assembly of FIG. 2A, FIG. 3B is an end elevation view of the assembly of FIG. 2A, and FIG. 3C is a cross-sectional view of the assembly of FIG. 2A taken along the line I—I of FIG. 3A. FIG. 3A illustrates the unitary nature of the assembly of FIG. 2A and depicts the relationship of the bosses 44 and 47 at the rear of the platform 42 of the backbone 34. FIG. 3B is of particular interest in that it illustrates how grommet retainer member 29 bears against one of the grommet 23, shown in dashed lines and prevents outward movement thereof. Retainer member 29 has first and second openings 77 and 78 in the wall 79 thereof, which openings are smaller than the openings 21 and 22 of the end plate 14, and hence are smaller than the grommet or grommets 23, but large enough to allow the cables to pass therethrough. FIG. 3C illustrates the relationship of grommet retainer 27, which bears against one end of the grommet (not shown), the backbone member 34, which bears against the other end of the grommet, the threaded bolt or stud 31, and the knob 33. IT can be seen that when knob 33 is tightened members 27 and 34 exert some pressure on the grommet which, being elastomeric, will tend to expand to fill bore 21 completely, thereby creating a strong seal. Further, the grommet is prevented from moving in an axial direction regardless of outside or interior forces thereon. The backbone or support 34 is held in place against the inner face 36 of end plate 14 by means of the stud 31, and is properly oriented by locating pins 37 and 38. It is within the scope of the present invention that the backbone 34 be an integral part of plate 14, in which case retainer 29 would supply the desired pressure against grommet 23.

FIGS. 4A and 4B are perspective views of the front and rear, respectively of grommet retainer member 29. As can be seen in these figures, wall 79 of retainer 29 has first and second openings 77 and 78 therein, as previously discussed. Adjacent the openings 77 and 78 are cable supports 75 upon which the cables rest. Each of the supports 75 and hence, retainer 29, truly adding to the resistance to cable movement. In addition, strength ribs 81 and 82 are on the front of member 29 and spaced from each other to accommodate a boss 83 having a bore 84 extending therethrough for passage of the stud 31. Boss 83 provides a surface against which knob 33 bears. Extending from the inner surface of wall 79 are first and second walls 86 and 87 which, together, substantially surround the openings 77 and 78 and which are configured to fit over elliptical bosses 88 and 89 on end plate 14, best seen in Fig., 5C. these walls insure proper location and orientation of retainer member 29 relative to end plate 14.

Figure 5C:
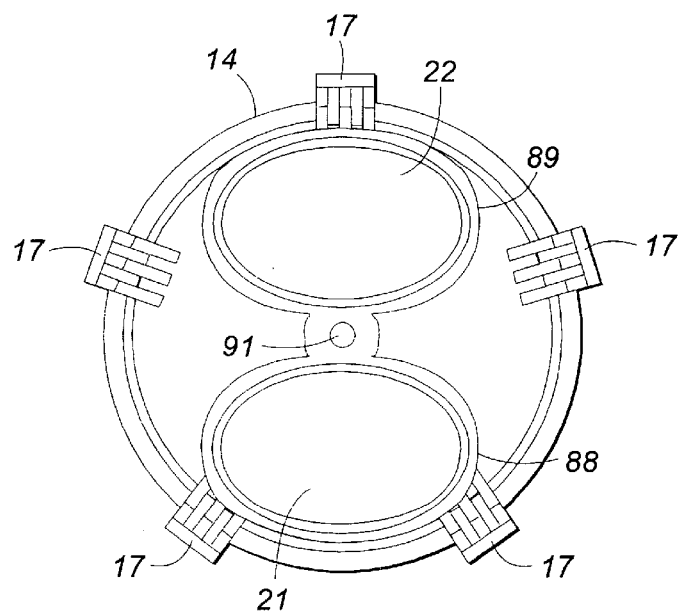
FIG. 5C is an elevation view of the exterior side of the end plate.

FIG. 5A is an elevation view of the interior face 36 of end plate 14, FIG. 5B is a side elevation view of the end plate 14, and FIG. 5C is an elevation view of the exterior face of end plate 14 showing, in particular, the configuration of bosses 88 and 89. Plate 14 is provided with a central bore 91 to allow passage of stud 31 therethrough which has a hexagonally shaped countersink 92 extending inwardly from face 36, as best seen in FIG. 5B. Countersink 92 is intended to receive a hexagonal section 93 formed on stud 31 to affix the stud in place with the desired degree of length extending in both directions from hexagonal member 93. Locating pin 37 and 38 extend from the face 36 for providing precise location of the backbone 34, which is shown in dashed outline in FIG. 5A. On the outer edge of end plate 14 is a locating slot 94, which is positioned to receive a locating lug 96 which is located on the open end rim of cover member 11. When the assembly of FIG. 2A is completed and is inserted into cover member 11, it is, oriented so that lug 96 fits into slot 94, thereby aligning lugs 59 and 61 so that, if desired, bracket 63 may be mounted.

Elliptical bosses 88 and 89 receive the grommet 23 and either a second grommet 23 or a port plug 27 and O-ring 28 therein. The grommet 23 completely fills the opening 21 and creates a waterproof and air tight seal between it and the opening 21. The outer walls of the bosses 88 and 89 are shaped and dimensioned to receive the openings in the grommet retainer member 29 defined by the walls 86 and 87, preferably in a slip fit.

Figure 6A:
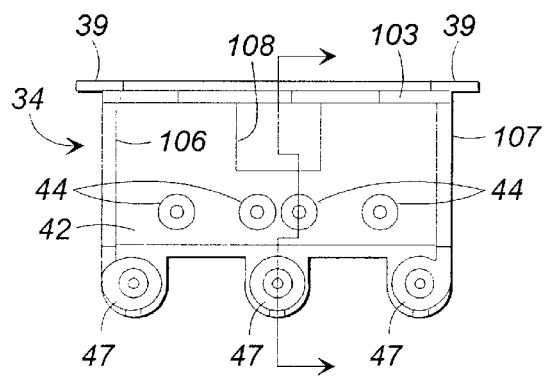
FIG. 6A is a plan view of the backbone member.
Figure 6C:
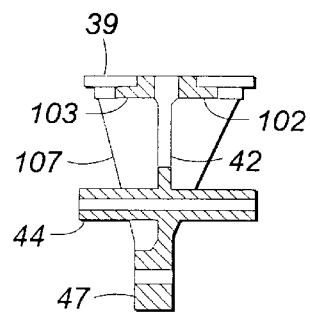
FIG. 6C is a cross-sectional view of the backbone member taken along the line II—II of FIG. 6A.
Figure 6B:
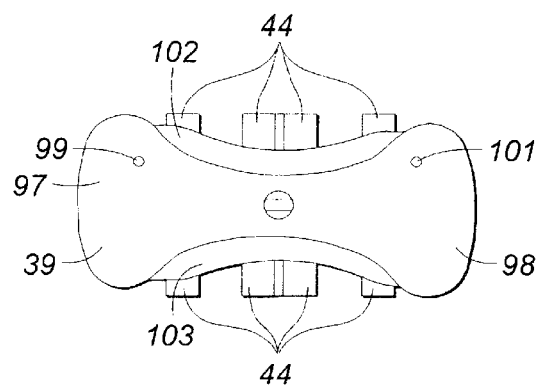
FIG. 6B is an elevation view of the face plate of the backbone member.

FIG. 6A is a plan view of the top side of the backbone or support member 34, FIG. 6B is an elevation view of the front of the backbone 34, and FIG. 6C is a cross-sectional elevation view of the backbone 42 taken along the line II—II of FIG. 2A. The wall 39, i.e., the wall that bears against surface 36 of end plate 14, has a roughly hour-glass shape, as best seen in FIG. 6B, and also as shown in dash lines in FIG. 5A. Each of the lobes 97 and 98 of wall 39 has a locating hole 99 and 101, respectively, spaced and dimensioned to receive the locating pins 37 and 38, respectively, projecting from surface 36 of the end plate 14. The rear surface of wall 39 has means forming first and second flanges 102 and 103 thereon which project into the open spaces between the lobes 97 and 98, and, as best seen in FIG. 5A, partially block openings 21 and 22. Normally, grommets 23 have transverse slits for facilitating passing the cables therethrough, thus creating grommet sections which can move relative to each other, which can destroy the seal. Flanges 102 and 103 prevent such independent movement of the sections. Flanges 102 and 103 also serve to prevent inward movement of grommets 23 and thus help hold the grommets firmly in place within the bores 21 and 22, despite the presence of external forces, for example. The wall/flange assembly has a central bore 104 therein for passage of stud or bolt 31. Extending rearwardly from either side of the wall 39 are spaced ribs 106 and 107 which support planar platform 42, which has an array of elongated bosses 44 extending therefrom on each side of the platform, as best seen in FIG. 6C. The distal or rear edge of platform 42 has bosses 47 formed thereon, as shown in FIG. 6A, which may be threaded or may serve as bearing surfaces for nuts for the bolts 46 which extend therein or therethrough. Platform 42 also has a cut-out portion 108 for providing room for a nut 45, shown in FIG. 3C, which anchors backbone 34 to stud 31 and endplate 14.

FIG. 7A is a perspective view of the cable sheath grip member 41 which, when mounted to the backbone 34 by means of bolts 43 and bosses 44, serves to grip the cable sheaths where terminated to prevent longitudinal movement of the cable which might break its seal within the grommets 23. As can best be seen in FIG. 7B, member 41 has a square U-shape comprising first and second arms 109 and 111 extending from a cross-arm or base 112. Each arm has a distal end 113 and 114, respectively formed as a U-shaped channel having serrations on the edges for gripping the cable sheath. Inasmuch as the arms 109 and 111 are cantilevered, they possess a degree of flexibility for accommodating to the position of the cable rather than forcing the cable into accommodation with them, which could break the cable-grommet seal. The sheath grip member 41 is capable of gripping a wide range of cable diameters, and, to insure positive gripping of small diameter cables, each of the channels 113 and 114 has rearwardly facing barbs or teeth 116 which insure gripping of the cable sheath when it is too small in diameter to be adequately gripped by the serrations in channels 113 and 114. Member 41 also has a plurality of spaced mounting holes 117 in the crossarm for mounting member 41 to the elongated bosses 44 and hence to the backbone 34. FIG. 7D is a cross-sectional view of cable sheath grip member 41 taken along the line III—III of FIG. 7B, and shows the configuration of the barbs 116. In those instances where electrical contact is not desired, base 112 can be separated into two non-contacting parts.

Figure 8A:
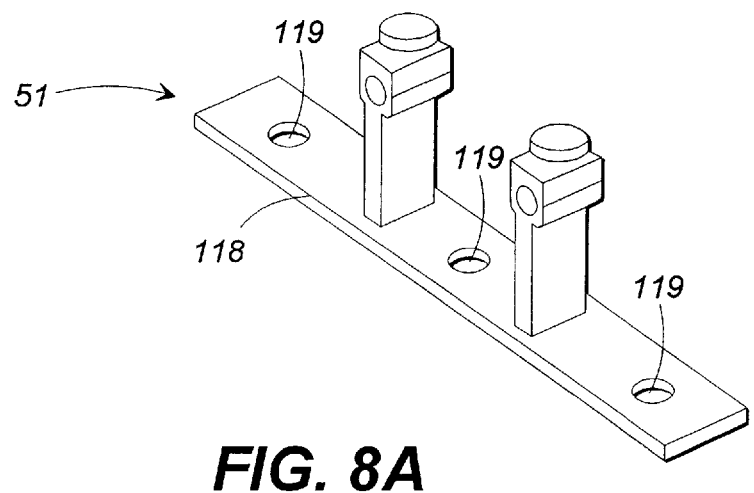
FIG. 8A is a perspective view of the central strength member anchor.
Figure 8B:
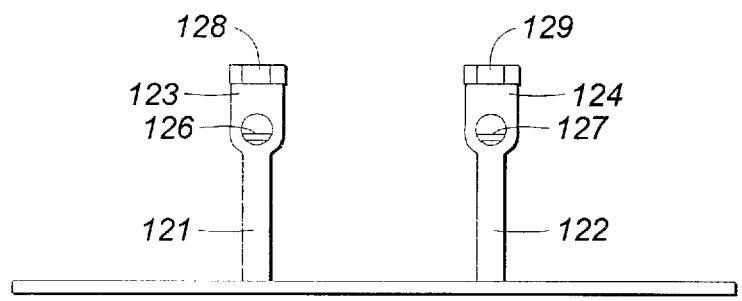
FIG. 8B is an elevation view of the central strength member anchor.
Figure 8C:
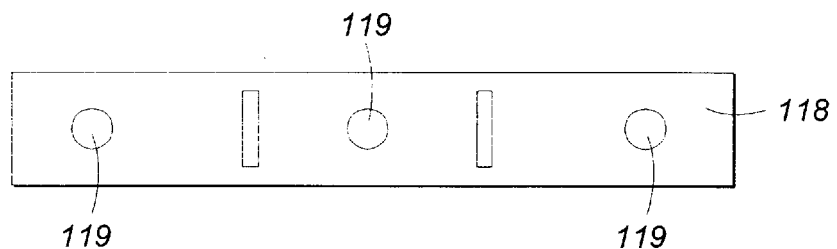
FIG. 8C is a plan view of the underside of the central strength member anchor.

FIG. 8A is a perspective view of the anchor member of the invention, and FIGS. 8B and 8C are elevation and plan views respectively of member 51. One popular configuration of optical fiber cable is the loose tube cable, in which a tubular member surrounds a plurality of buffered tubes containing fibers which are loosely bunched therein or wound around a strength member. Such a cable requires a strength member which usually extends roughly down the center of the tubular member. With such a cable configuration, the sheath grip member might not adequately immobilize the cable, hence a unit such as anchor member 51 is used to accomplish the desired immobilization.

The unit 51 comprises a base member or plate 118 having mounting holes 119 spaced therealong for mounting the unit 51 to bosses 47 by means of bolts 46. Extending from plate 118 are first and second spaced stanchions 121 and 122, the distal ends of which have enlarged portions 123 and 124, respectively, having bores 126 and 127 extending therethrough for receiving the central strength member, and clamping screws 128 and 129 for clamping the central strength members within the bores 126 and 127.

Assembly of the closure is relatively simple and can be performed on site or in the field without the expenditure of a large amount of time. In general the procedure for assembly comprises attaching the sheath grip to the cables, then inserting them into the grommet 23, then inserting the grommet into the end plate, attaching the sheath grip to the backbone and mounting the retainer. The organizer 48 and tray 49 are assembled together and mounted to the backbone 34 along with central strength member anchor 51. Knob 33 is then tightened on stud 31 to form a unitary assembly. The fibers are then separated from each other and routed in a manner similar to that shown in U.S. Pats. No. 4,679,896 of Krafcik, et al, 5,0!97,529 of Cobb, et al., or 5,185,845 of Jones. With support member 56 snapped onto organizer 48, the entire assembly is then inserted into cover 11 and the cover-center latches are snapped over lugs 17, pulling the end plate 14 against the rim of open end 13 of cover 11, thereby compressing O-ring 18 to seal the interior of the closure 10. A compressed air test may then be performed using air inlet valve, not shown, which mounts in a boss 74, after which test the valve is removed and boss 74 is sealed by plug 76. Thus, it can be seen that there are relatively few parts to be assembled, and the backbone 34 is, the central locus of the assembly, thereby greatly simplifying the process.

The closure of the invention is compact, relatively flight weight, and possesses, when assembled, a high degree of isolation of the interior from ambient atmosphere and moisture. The high sealing integrity is reproducible, that is, the closure may be opened so that work may be performed on the fibers and fiber splices or cables added, and then reassembled with the same high sealing integrity. The use of encapsulant is obviated, which materially facilitates opening the closure and adding cables, and relieves the installer or maintenance person of having to re-encapsulate the interior parts the closure.

It is to be understood that the various features of the present invention as hereinbefore disclosed and described might be incorporated into other types of closures, and that other modifications or adaptations might occur to workers in the art. All such variations, modifications, or adaptations are intended to be included herein as being within the scope of the present invention as set forth. Further, in the claims hereinafter, the corresponding structures, materials, acts, and equivalents of all means or step-plus-function elements are intended to include any structure, material, or acts for performing the functions in combination with other elements as specifically claimed.

What is claimed is:

1. A closure for optical fiber cables comprising:
   a cover member having a closed end and an open end;
   an end plate for closing said open end, said end plate having an inner face and an exterior side and first and second bores extending therethrough for receiving grommet sealing members through which the cables pass;
   a sealing member for providing a substantially water-tight seal between said cover member and said end plate and clamping means for clamping said end plate to said cover member;
   at least one grommet sealing member;
   said inner face having a backbone protruding therefrom, said backbone including means for partially blocking said first and second bores to restrict inward movement of said grommet sealing members in said bores;
   said backbone further comprising a support platform for supporting one end of a cable organizer and a splice tray thereon; and
   cable sheath grip means mounted on said backbone for providing electrical connection between cables and for gripping the cable.

2. A closure as claimed in claim 1 and further comprising a grommet retainer member adapted to be mounted to the exterior side of said end plate and to bear against said grommets to restrict outward movement of said grommet sealing members.

3. A closure as claimed in claim 2 and further comprising means for mounting said retainer member to said end plate.

4. A closure as claimed in claim 1 wherein said backbone is integral with said end plate.

5. A closure as claimed in claim 1 wherein said backbone is mounted to said inner face of said end plate.

6. A closure as claimed in claim 5 and further including means for locating and orienting said backbone on said inner face.

7. A closure as described in claim 1 and further comprising a central strength member anchor; and
   means for mounting said central strength member anchor and said one end of said cable organizer to said support platform.

8. A closure as claimed in claim 1 and further comprising a support member for supporting the end of said cable organizer remote from said one end thereof in said cover member.

9. A closure as claimed in claim 1 wherein said cable sheath grip means comprises a metallic member having a base member and first and second spaced arms extending from said base member and having distal ends; and
   means for mounting said base member of said cable sheath grip means to said backbone in spaced relationship to said support platform.

10. A closure as claimed in claim 9 wherein said distal ends of said first and second arms each form a U-shaped channel having serrated edges.

11. A closure as claimed in claim 10 wherein each of said U-shaped channels has rearwardlly facing barbs.

12. A closure for receiving optical fiber cables comprising:
    an elongated substantially cylindrical cover member having a closed end and an open end;

an end plate for closing said open end, said end plate having an inner face and an exterior side and first and second bores extending therethrough for receiving one or more grommet sealing members through which the cables pass;

a sealing member for providing a substantially water and air tight seal between the open end of said cover member and said end plate;

said end plate having lug members on the periphery thereof;

clamping means on said cover member for engaging said lug members for clamping said end plate to said cover member;

at least one grommet sealing member in one of said, first and second bores adapted to receive one or more cables passing therethrough, each of said grommet members forming a substantially water-tight seal between the cables and said end plate;

a backbone support member extending from said inner face of said end plate, said backbone support member having means for partially blocking said first and second bores to restrict inward movement of said grommet sealing members in said bores and a support platform extending from said means for blocking;

a cable sheath grip member;

said platform having means thereon for supporting said sheath grip member in spaced relation to said platform; and said platform further having means thereon for mounting one end of a cable organizer thereto.

13. A closure as claimed in claim 12 and further comprising a grommet retainer member adapted to be mounted to the exterior side of said end plate for restricting outward movement of said grommet sealing members.

14. A closure as claimed in claim 12 wherein said clamping means comprises over center clamps.

15. A closure as claimed in claim 12 wherein said backbone support member is integral with said end plate.

16. A closure as claimed in claim 12 wherein said backbone support member is mounted to said inner face of said end plate.

17. A closure as claimed in claim 16 and further comprising a grommet retainer member adapted to be mounted to the exterior side of said end plate; and means for adjustably mounting said grommet retainer member and said backbone support member to said end plate.

18. A closure as claimed in claim 17 wherein said backbone support member comprises a wall portion having first and second lobes; and flange means extending into the open space between said lobes for partially blocking said first and second bores.

19. A closure as claimed in claim 18 wherein:

each of said lobes has locating means thereon for locating said backbone support member relative to said end plate; and means on said inner face of said end plate for mating with said locating means.

20. A closure as claimed in claim 12 and further comprising a central strength member anchor means; and means for mounting said anchor means to said cable organizer and said platform.

* * * * *